F. J. MARTEL, C. A. BRIGGS, D. L. MACAULAY, W. R. WRIGHT AND F. WENNER.
MACHINE GUN CONTROL SYSTEM.
APPLICATION FILED DEC. 10, 1919.
1,349,140.  Patented Aug. 10, 1920.
5 SHEETS—SHEET 1.
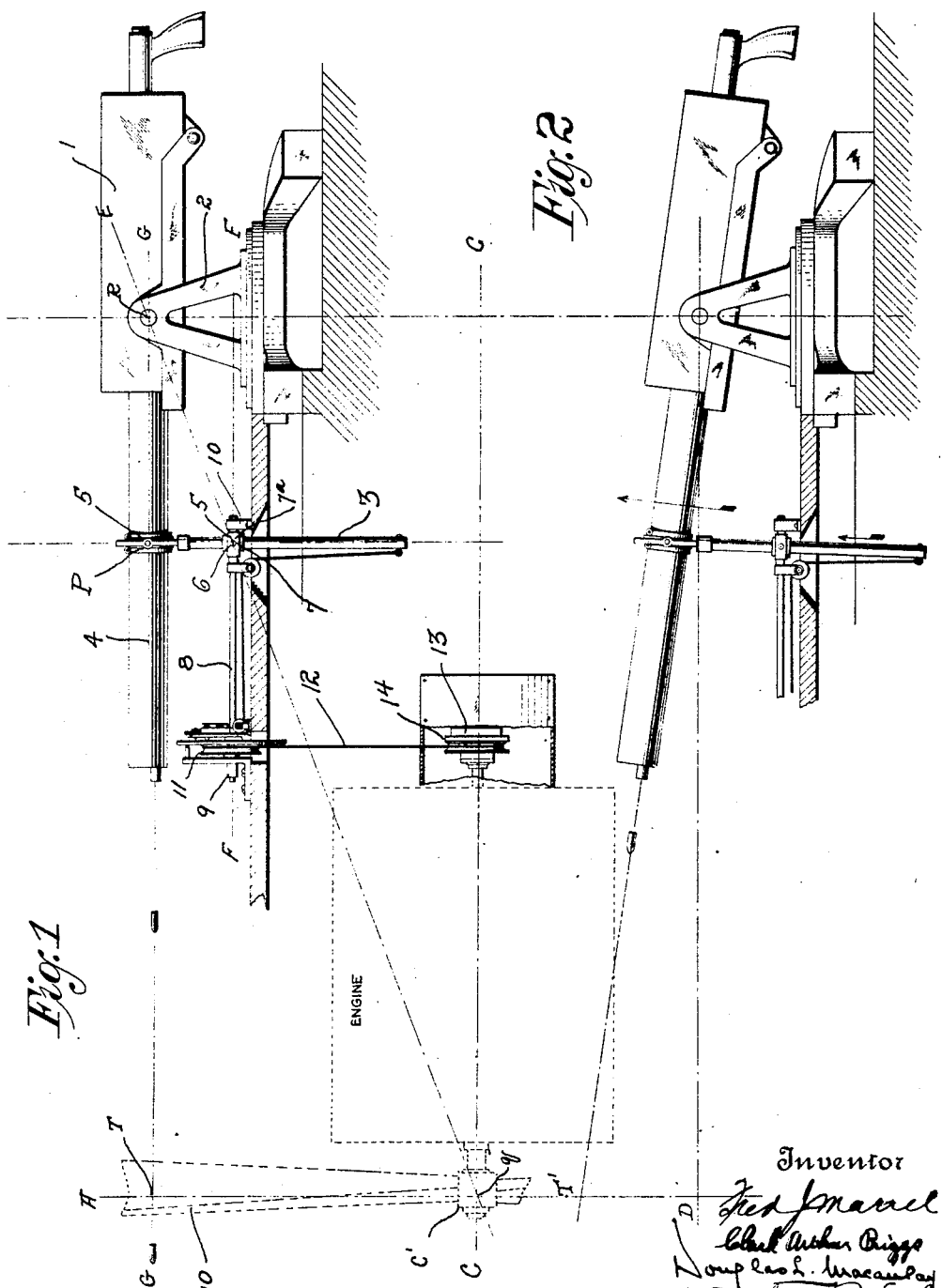

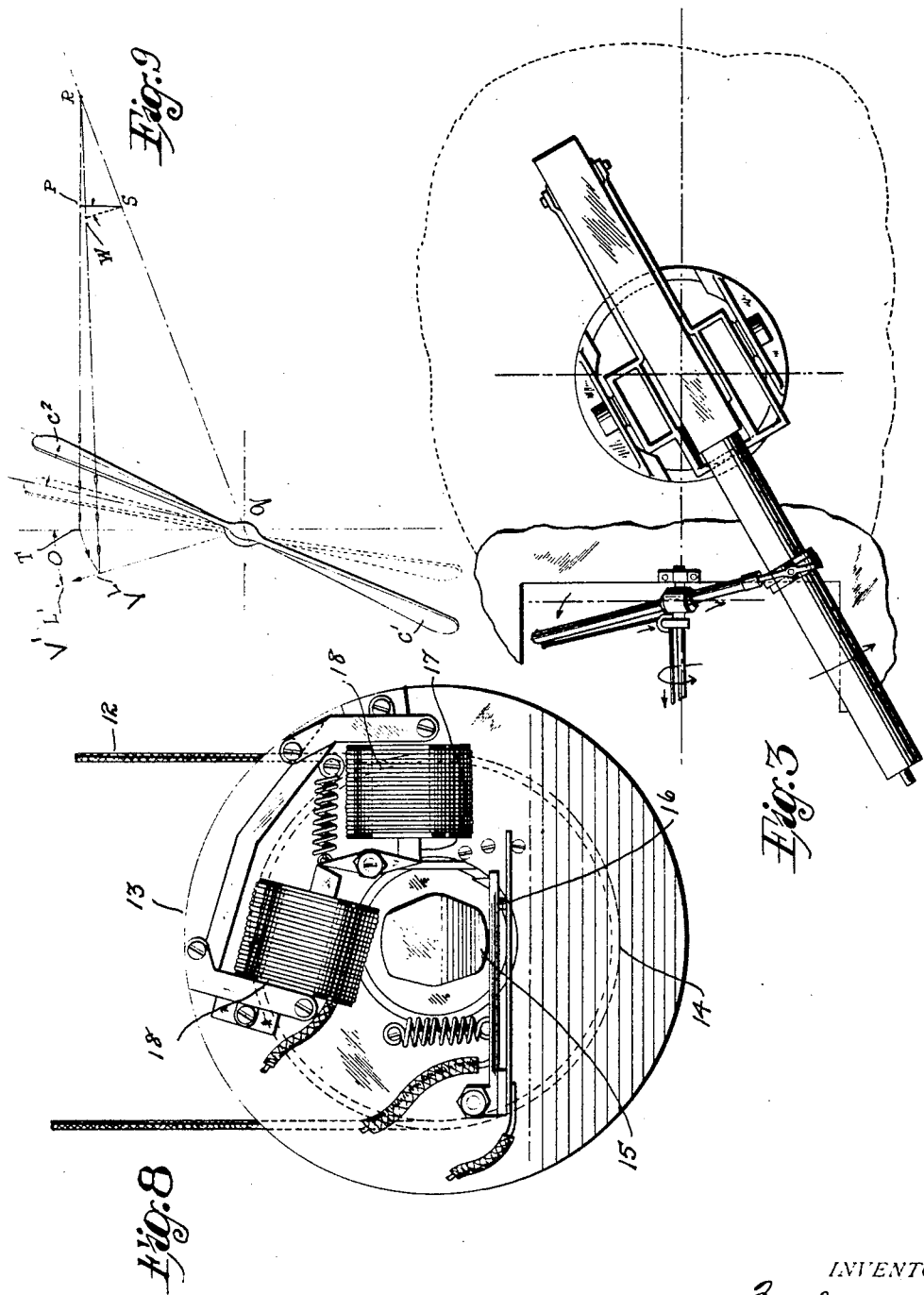

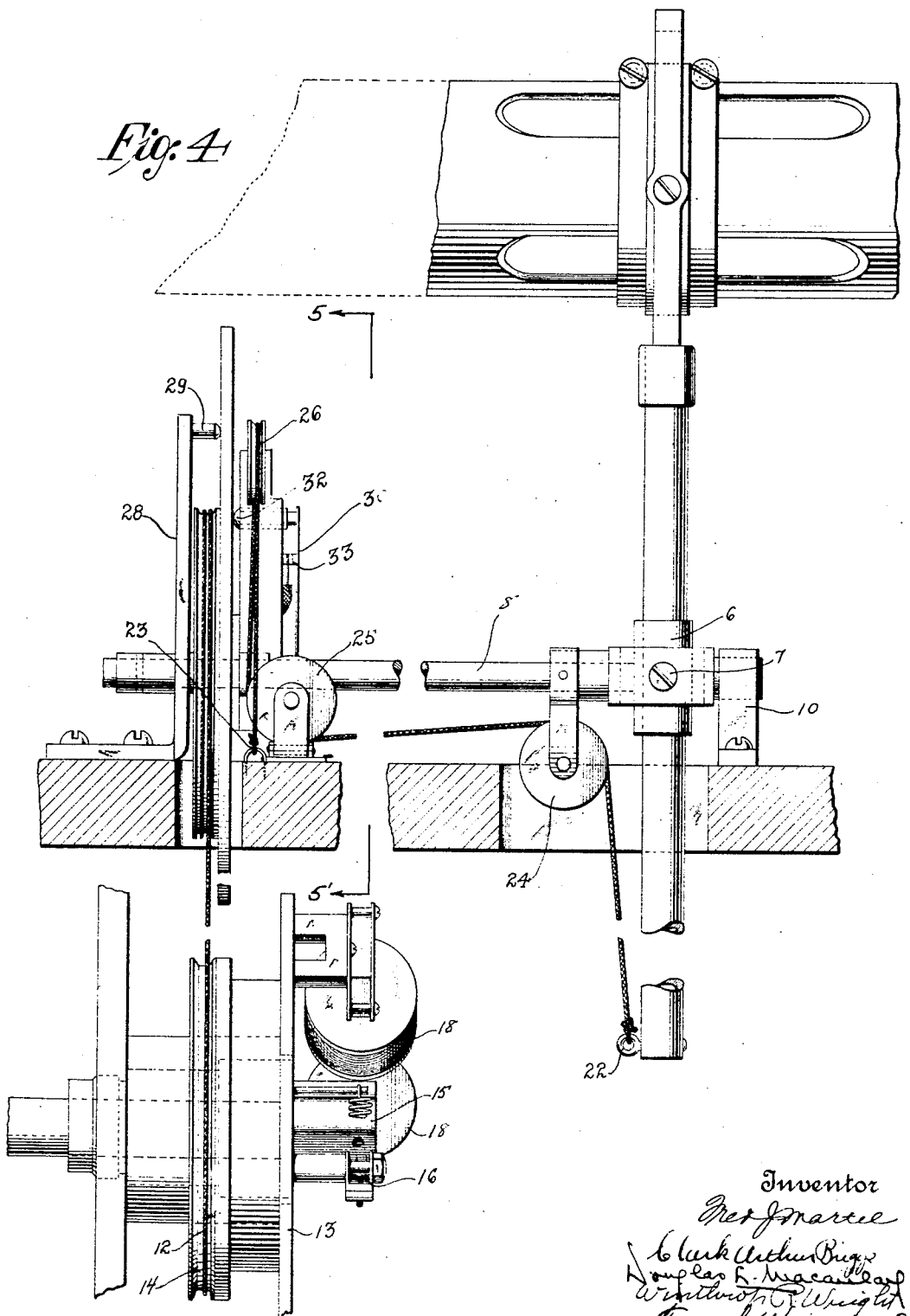

F. J. MARTEL, C. A. BRIGGS, D. L. MACAULAY, W. R. WRIGHT AND F. WENNER.
MACHINE GUN CONTROL SYSTEM.
APPLICATION FILED DEC. 10, 1919.
1,349,140.
Patented Aug. 10, 1920.
5 SHEETS—SHEET 4.
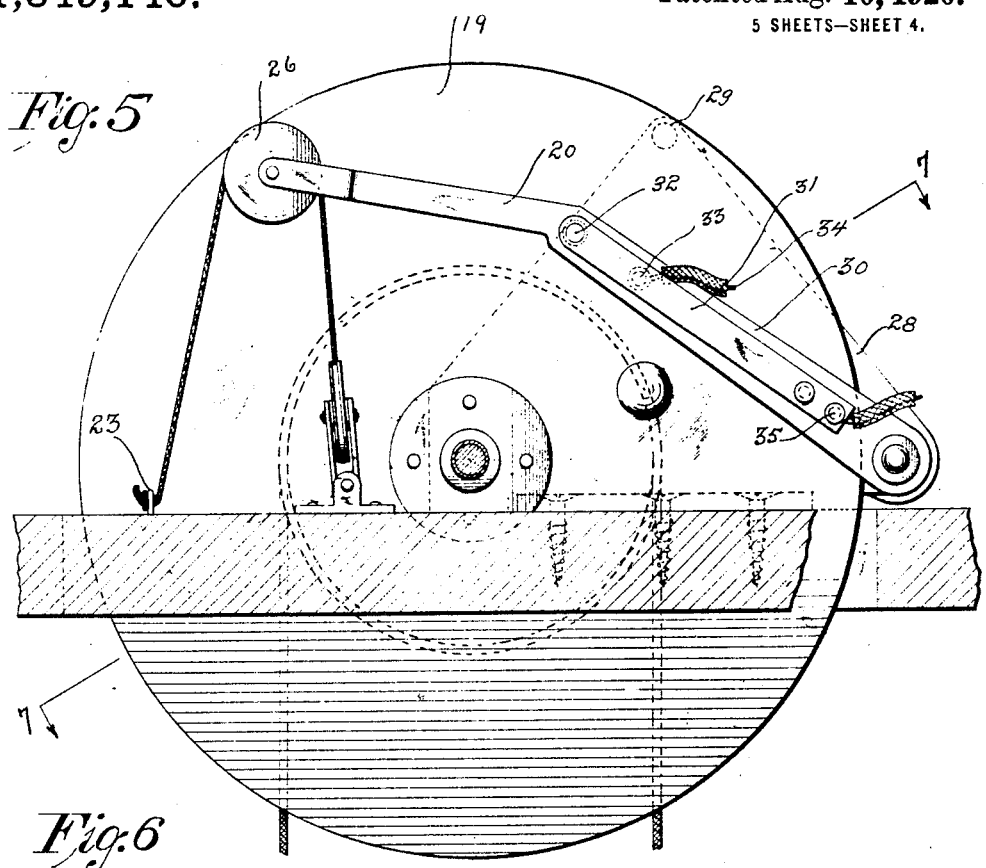
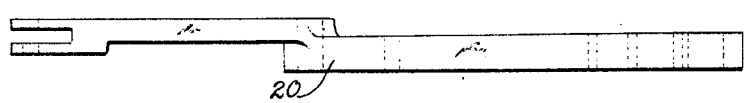
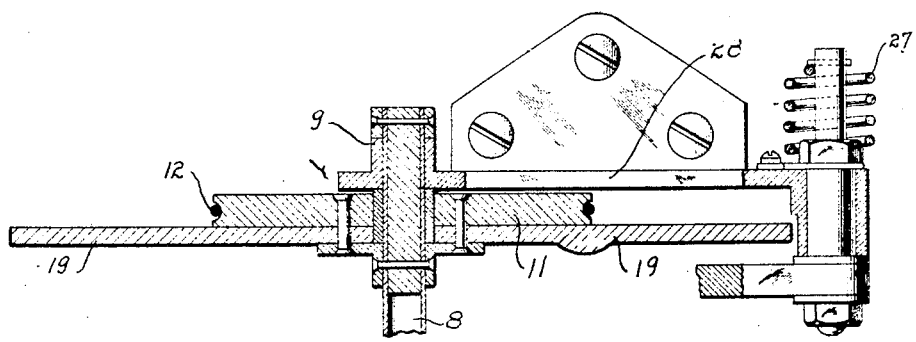
Inventor

UNITED STATES PATENT OFFICE.

FRED J. MARTEL, OF HANOVER, NEW HAMPSHIRE, CLARK ARTHUR BRIGGS, OF JOPLIN, MISSOURI, DOUGLAS L. MACAULAY, OF MONTREAL, QUEBEC, CANADA, WINTHROP R. WRIGHT, OF SWARTHMORE, PENNSYLVANIA, AND FRANK WENNER, OF AZADIA PARK, DISTRICT OF COLUMBIA, ASSIGNORS TO NEWTON D. BAKER, SECRETARY OF WAR, TRUSTEE.

MACHINE-GUN-CONTROL SYSTEM.

1,349,140.  Specification of Letters Patent.  Patented Aug. 10, 1920.

Application filed December 10, 1919. Serial No. 343,973.

(FILED UNDER THE ACT OF MARCH 3, 1883, 22 STAT. L., 625.)

*To all whom it may concern:*

Be it known that we, FRED J. MARTEL, CLARK ARTHUR BRIGGS, citizens of the United States, DOUGLAS L. MACAULAY, a subject of the King of Great Britain, and WINTHROP R. WRIGHT and FRANK WENNER, citizens of the United States, residing, respectively, at Hanover, Grafton county, New Hampshire; Joplin, Jasper county, Missouri; Montreal, Province of Quebec, Canada; Swarthmore, Delaware county, Pennsylvania; and Azadia Park, District of Columbia, have invented an Improvement in Machine-Gun-Control Systems, of which the following is a specification.

The invention described herein may be used by the Government, or any of its officers or employees in prosecution of work for the Government, or by any other person in the United States, without payment of any royalty thereon.

This invention relates to a machine gun control system or synchronizing gear for airplanes and has for its principal object to permit a machine gun to be traversed within certain limits when the operator desires to aim the machine gun, but in which the firing of the gun is automatically controlled so that it cannot be fired when aimed at the revolving blades of the propeller or at a fixed part of the airplane.

As heretofore constructed, synchronizing gears both of mechanical and electrical types have been applied to machine guns on airplanes, but it has been found necessary to fix the machine gun to fire in one direction only, so that in order to aim the gun it is necessary to maneuver the entire airplane into the proper position to bring the gun into line with the target. The effect of fire from a gun so fixed on an airplane depends largely upon the skill of the aviator in maneuvering his plane, because it is impossible to maintain fire upon the target except when the airplane is in direct alinement with the target. It is obvious, therefore, that the provision of a synchronizing device, which will permit the gun to be traversed and aimed will greatly increase the effectiveness of machine gun fire of combat planes.

In a prior application, filed August 26, 1919 by Frank Wenner and Fred J. Martel, bearing Serial Number 320,014, an electrical synchronizing gear is disclosed which synchronizes the fire of a fixed airplane gun with the blades of the propeller by means of an electrical contact controlled by a part moving in phase with the propeller.

Reference is made to said application for a more detailed description of an electrical system which combines the advantage of flexibility with a device in which the overall time-lag of the various parts, which must act successively between the beginning of the actuation of the control mechanism and passage of the projectile through the plane of propeller, is reduced to a point where no regulation of the phase in which the firing takes place in relation to the position of the propeller is necessary as the speed of the propeller changes. We have found it preferable to utilize an electrical control system of the type described in said application, in connection with the present invention, because of the practically negligible time-lag of this control device, and because of the flexibility of an electrical control, which may be applied to a pivoted or traversing gun by means of conducting wires much more readily than can any purely mechanical synchronizing gear. However, we do not wish to be understood as limiting ourselves to the use of the specific electrical control system described in the application above mentioned, nor to any electrical control system, for it will be seen that the present invention may be utilized in conjunction with a mechanical synchronizing gear, if desired.

A study of the problem of providing a synchronizing device for traversing guns discloses that the gun fire should be controlled for two classes of obstructions in the area through which the gun traverses, namely, the moving propeller blades, and fixed objects, such as struts, wings, fusilage, or the like.

It will therefore be seen, as will be hereinafter more fully disclosed, that the present invention includes a combination of two separate, but interdependent, control devices, one of which provides for synchronizing the gun-fire with the moving blades of the propeller, and the other of which limits the fire to a predetermined "safe" area, unobstructed by any fixed part on the airplane.

Referring to the drawings:

Figure 1 is a side view of the control mechanism applied to a machine gun mounted in an airplane, the airplane propeller being shown in dotted lines, illustrating the gun in a position parallel to the main axis of the propeller;

Fig. 2 is a side view of the gun and a portion of the control mechanism, showing the position of the vertical control rod when the gun is raised from the horizontal position shown in Fig. 1;

Fig. 3 is a top view of the same, showing the position of the vertical control rod when the gun is swung laterally to the left;

Fig. 4 is an enlarged fragmentary side view of the control mechanism;

Fig. 5 is a cross section of the control mechanism taken on line 5—5 of Fig. 4, to a larger scale than that of Fig. 4;

Fig. 6 is a detailed top view of the contact arm, to the same scale as Fig. 5;

Fig. 7 is a cross section of the contact disk and associated parts, taken on line 7—7 on Fig. 5;

Fig. 8 is an enlarged detailed view of the synchronizing commutator;

Fig. 9 is a diagrammatic view in perspective to illustrate the effect of shots passing through the imaginary plane of revolution of the propeller, when the gun is swung to various positions;

Figure 10:
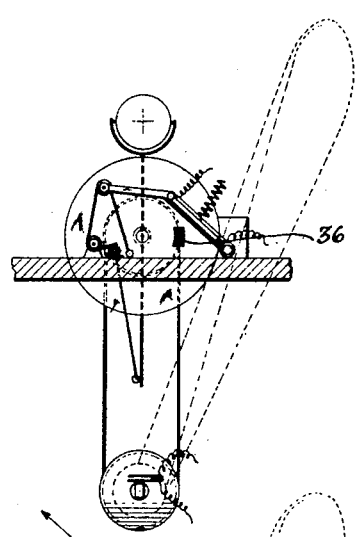
Fig. 10 is a diagrammatic view of the control system showing the position of the respective parts when the gun is held in position parallel to the main axis of the airplane, as shown in Fig. 1.

As has been above stated, the embodiment of our invention illustrated herewith provides a combination of interdependent control devices, one of which synchronizes the traversable gun with the moving propeller blades and the other of which limits the fire to "safe," or unobstructed, areas.

The two functions of this device will therefore be referred to and described separately, in the order mentioned.

The synchronizing mechanism comprises a control rod 3 connected at its upper end to the gun barrel 4 by universal joint 5 to permit the gun to be traversed to any desired position. Said control rod is slidably mounted in a collar 6, pivoted transversely in a yoke 7ª, mounted on a shaft 8, as shown. The shaft 8 is mounted on suitable bearings 9 and 10, and is provided with a drum or pulley 11 connected by a belt 12, or other suitable means, to a circuit interrupter or commutator 13, mounted on the propeller shaft, or any rotating part of the motor, so as to be operated synchronously with the propeller. In the construction illustrated the pulley 11 and commutator 13 are connected in a 1 to 1 ratio.

The commutator 13 illustrated herein is an electrical contact device similar to that illustrated and fully described in the prior application, Serial No. 320,014, above mentioned, in which a cam 15 (Fig. 8) on the propeller shaft or other rotating part of the motor tends to open a switch 16 to fire the gun only when the blades are in such position as not to be struck by the projectile. The arrangement illustrated, however, is such that this switch is normally held in inoperative position by the armature arm 17, but the latter may be actuated by electromagnets 18, 18 in the control circuit (not shown) so as to allow the switch to be opened by the cam when the gun is ready to fire and the operator desires the gun to fire. Any other suitable interrupter device, operating in phase with the propeller, may be substituted, if desired.

The operation of the synchronizing mechanism may best be explained with reference to the geometrical problem involved. For convenience, it is preferable to consider that any movement of the gun, and its line of fire, may be resolved into two component movements, one of which is along a radius on the plane of revolution D, with the axis C—C the center thereof, and the other of which is a rotation about the said axis C—C. (See Fig. 9). In other words, if the line of fire is moved from some point T to another point V¹, on the plane of revolution D, it may be considered that the line of fire is swung through an arc T—V with the point of revolution Q of the propeller as a center, and is then moved outwardly along the radial line V—V¹ to the desired point V¹. The movement of the line of fire along a radius will hereinafter be termed a "radial" movement, and the movement about an arc with the center of revolution q as the center will be termed an "angular" movement.

Referring now to Figs. 1 and 10, the gun 1 is shown in initial position with the line of fire G—G parallel to the axis C—C of the propeller, and intersecting the transverse plane of revolution D of the propeller at a point T. Passing an imaginary plane through the center of revolution R of the gun, point T, and the center of revolution $q$ of the propeller, a right angle triangle T $q$ R is formed, with the line $q$ R as the hypotenuse. The plane T $q$ R intersects the plane of revolution D on the line T $q$. The axis F—F of the shaft 8 intersects the line $q$ R at S (Fig. 9), which coincides with the pivot point 7 of the control rod 3 as shown. This arrangement brings the control rod 3 in the same plane as the triangle T $q$ R.

With the gun in said initial position, the commutator 13 is adjusted so as to open the circuit and fire the gun when the propeller reaches a predetermined position, and the projectile will intersect the plane of revolution D at a point T while propeller blades $C^2$, $C^2$, are in the position shown in full lines in Fig. 9.

Figure 11:
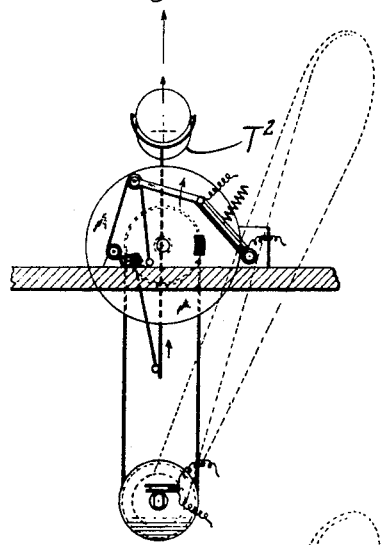
Fig. 11 is a view similar to Fig. 10, but illustrating the relative movement of the parts when the muzzle of the gun is elevated from a horizontal position.

It will now be seen that the gun will be synchronized to fire in the same angular relation to the propeller blades when the gun is moved radially, i. e., raised or lowered, in the same plane T $q$ R, because the control rod 3 is slidably mounted in the collar 6 and will move up or down therein without changing the position of the shaft 8, or the commutator 13 connected therewith. For instance, if the line of fire is raised to some point T' (Figs. 2, and 11) the commutator will not change its position in relation to the actuating cam 15. Similarly, no change in position of the commutator occurs when the gun is depressed to some point $T^2$. Consequently, the gun will be synchronized to fire at the proper moment while the gun is held in any position in the plane T $q$ R, excepting, of course, when aimed at the hub $C^1$ of the propeller, or other fixed part on the airplane.

Figure 12:
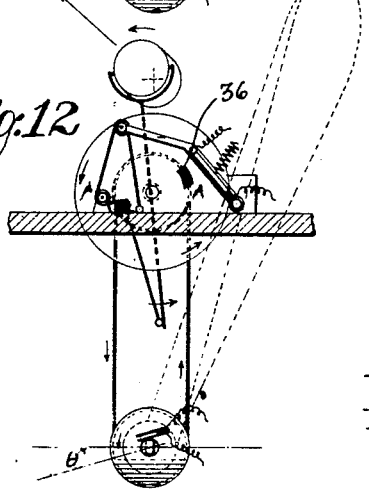
Fig. 12 is a view similar to Fig. 11 illustrating the relative movement of the parts when the gun is swung upwardly and to the right of the vertical plane passing through the horizontal axis of the airplane.

Now, if the gun is desired to be swung laterally to a position shown in Figs. 3 and 12, the line of fire will intersect the plane of revolution D at some point $V^1$. The movement of line of fire may be resolved into an angular movement through the arc T—V, and a radial movement along the line V—$V^1$, as before suggested. It will be observed that the control rod 3 being pivoted on the shaft 8 at the point S on line $q$ R, will have an angular movement through an arc P—W to a new position W, which is in the new plane V $q$ R. This angular movement of the control rod is the same as the angular movement of line of fire through the arc T—V. In other words, the gun and control rod 3 may be considered as in a new plane V $q$ R revolved through an angle θ about the line $q$ R, as shown in Fig. 9. The shaft 8 will be moved through the angle θ, and being connected to the commutator, as before described, will advance the firing point of the commutator through the same angle θ, as shown in Fig. 12. The change in the position of the commutator will therefore cause the gun to be fired when the propeller is in the position shown in dotted lines of Fig. 9. Furthermore, the gun may be moved radially to any point $V^1$ in the plane V $q$ R without changing the position, or phaze of the commutator. It will now be apparent, that if the gun is moved through any angle either to the right or left of the vertical axis, the commutator will be advanced or retarded through the same angle and the time of firing will take place in substantially the same angular relation behind the propeller in all permissible positions of the gun.

Although the distance R V is greater than the distance R T, yet this difference only causes a delay in the time of arrival of the projectile at the plane of revolution of the propeller, and this delay has been found to be so small that it may be disregarded.

In considering the above described mechanism for synchronizing the traversable gun with the propeller, it is at once obvious that some limits to the movement of the gun must be provided, as otherwise the gun could be fired at the center or hub $C^1$ of the propeller, or would come in line with certain fixed parts on the airplane. It is also obvious that mechanical stops, limiting the traversing of the gun to a predetermined area would ordinarily be satisfactory for this purpose. But, when as is often the case, the airplane is so constructed that a strut, stay or the like, is positioned in and across the area through which it is desired to traverse the gun, the use of such mechanical stops would not permit the gun to be traversed across a strut or stay, to be fired in another "safe" area.

In the present invention, mechanism is provided which will automatically restrict the gunfire to a plurality of unobstructed areas. This mechanism comprises a contact disk 19, preferably mounted to turn with the shaft 8, a movable contact arm 20 associated with said disk, and a cord 21 attached at one end to the lower end 22 of the control rod 3 and at the other end to a fixed point 23 adjacent the disk 19. Said cord is led over a pulley 24, adjacent the pivot point 7 of the control rod, a second pulley 25 adjacent the disk 19, and over a third pulley 26 on the end of the arm 20, as shown. The contact arm is pivotally mounted to swing parallel and adjacent the disk 19, and is under tension of the spring 27 tending to force the arm upwardly. A suitable support 28 carries said arm 20 and associated spring 27, said support being also provided with a bearing projection 29, adapted to engage the outer periphery of the disk 19 to hold the latter in proper position.

Figure 13:
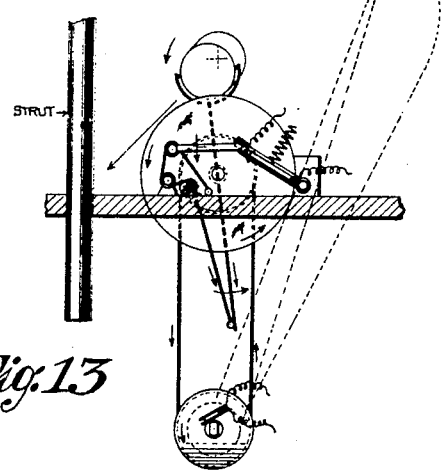
Fig. 13 is a view similar to Fig. 12 but in which the gun is depressed from its horizontal axis and to the right of its vertical axis so as to come in line with a strut, in which position the control system is placed in an inoperative position.

An electrical contact device 30 is mounted on the arm 20, and comprises an insulated flat spring 31, having a projection 32 adapted to extend through the arm 20 to engage the surface of the disk 19. An electrical contact switch 33 is provided to form a contact between said spring 31, and the arm 20. Said switch may be normally closed as shown, in which position the control circuit through the electrical connections 34 and 35 is closed, to permit the gun to be fired at the instant the synchronizing mechanism and control circuit is in proper position. The disk 19 is further provided with a series of raised portions or areas 36 (see Figs. 10 to 13), to correspond with any fixed portion of the airplane. The arrangement of said raised portions 36 on the disk 19 is such, that when the gun is aimed at a fixed portion on the airplane such as a strut, the disk 19 is turned by the rotating movement of the control rod 3, and the arm 20 is raised or lowered by the endwise movement of the same rod, to a position shown in Fig. 13, in which the raised portion 36 comes in contact with the projection 32 of the contact device, and opens the contact 33 so as to render the gun inoperative while pointed in line with said strut. The location of the raised portions 26 on the disk 19 may be fixed at the time the apparatus is installed, by experimentally determining the various positions of the contact projection 32 when the gun is aimed at a fixed portion on the airplane. Consequently, when the apparatus is in use, the gunfire will be restricted within certain prescribed and predetermined areas. As the projection 32 is free to move from one side of a raised portion to the other, the gun may be accordingly traversed across a fixed strut corresponding to the said raised portion and be fired on the other side of the strut, and yet be automatically rendered inoperative while aimed directly at the same.

The specific arrangement of a control mechanism constructed in accordance with this invention may be varied in many ways. We have illustrated an electrical control system in which a circuit of the gun control system is opened by the commutator to fire the gun and a circuit is opened by projections on the disk 19 coming in contact with the interrupter device 30, to render the gun inoperative. In the prior application Serial No. 320,014 before mentioned, modifications of electrical circuits are disclosed in which the control system may be controlled either by opening or closing the control switches. It will be seen, therefore, that the present invention is not limited to the form of electrical devices operated thereby. Furthermore, we contemplate that a mechanically operated control system may be provided, in which the firing point of the gun is changed to correspond with the angular movements of the gun, and also, a mechanical system could be substituted for the electrical contact system herein described, for restricting the gun fire to unobstructed areas.

What we claim as new and desire to secure by Letters Patent is:

1. In a device of the class described, the combination with a propeller and a traversable machine gun mounted adjacent thereto, of means for timing the firing of the gun, a member controlled by said gun and having a fixed pivot substantially on a line with the center of revolution of said gun and the center of revolution of the propeller, and means associated with said member for transmitting the angular movement of said member to said timing means, and for interrupting the firing when the gun is aimed at a fixed object on the airplane.

2. In a device of the class described, the combination with a propeller and a traversable machine gun mounted adjacent thereto, of means for timing the firing of the gun, and means for changing the time of firing as the gun is traversed, comprising a member controlled by said gun and having a fixed pivot substantially on a line with the center of revolution of said gun and the center of revolution of the propeller, means affording radial movement of said member relative to said pivot, and means for transmitting the angular movement of said member to said timing means and for interrupting the firing when the gun is aimed at a fixed object on the airplane.

3. In a device of the class described, in combination with a propeller and a traversable machine gun, of means for timing the firing of the gun, a movable member controlled by said gun adapted to have radial and angular movement about a point adjacent said gun, a disk-like member provided with an uneven surface, the inequalities of said surface being determined by the relative location of said gun and the fixed parts of said airplane, means for transmitting the angular movement of said member to said disk-like member, a movable arm having a part adapted to contact with said uneven surface, means for transmitting the radial movement of said movable member to said arm, and means operated by said part contacting with said disk-like member for controlling the firing of said gun, and means connecting said disk-like member and said timing means for changing the time of firing when the gun is traversed.

4. In a device of the class described, in combination with a traversable machine gun, of a control rod connected to said gun, a collar affording endwise movement of said rod, a shaft attached to said collar, a disk-like member mounted on said shaft, said disk-like member provided with a surface having projections, the location of said projections being determined by the relative position of said gun and the fixed parts of said airplane, a movable arm adjacent said disk-like member, a part moving with said arm adapted to have contact with the surface of said disk-like member, means for transmitting a relative endwise movement of said rod in said collar to said arm, and means operated by said part contacting with said disk-like member for controlling the firing of said gun.

5. In a device of the class described, the combination with a traversable machine gun, of a movable member controlled by said gun adapted to have radial and angular movement about a point adjacent said gun, a disk-like member having an uneven surface, the inequalities of said surface being determined by the relative position of the gun and the fixed parts of said airplane, means for transmitting the angular movement of said member to said disk-like member, and means for controlling the firing of the gun, said last named means being actuated by a part having contact with said disk-like member and actuated by the radial movement of said movable member.

6. In a device of the class described, the combination with a traversable machine gun, of a movable member controlled by said gun and adapted to have radial and angular movement about a point adjacent said gun, a disk-like member having a surface provided with projections, the location of said projections being determined by the relative position of the gun and the fixed parts of said airplane, means for transmitting the angular movement of said member to said disk-like member, a movable arm having a part in contact with the surface of said disk-like member, means for transmitting the radial movement of said member to said arm, and means operated by said part in contact with said disk-like member for controlling the firing of said gun.

7. In a device of the class described, the combination with a traversable machine gun, of a control rod connected to said gun, a collar attached to said rod and affording endwise movement thereof, a shaft attached to said collar, a disk-like member mounted on said shaft and provided with projections on the surface thereof, the location of said projections being determined by the relative position of the gun and the fixed parts of said airplane, a movable arm adjacent said disk-like member and adapted to contact with the surface thereof, means for transmitting an endwise movement of said rod in said collar to said arm, means for transmitting the movement of the gun to said disk, and means for controlling the firing of the gun, the operation of said last named means being conjointly determined by the disk-like member and the contacting arm.

FRED J. MARTEL.
CLARK ARTHUR BRIGGS.
DOUGLAS L. MACAULAY.
WINTHROP R. WRIGHT.
FRANK WENNER.